United States Patent
Koyama

(10) Patent No.: US 8,615,007 B2
(45) Date of Patent: *Dec. 24, 2013

(54) NETWORK SWITCHING SYSTEM WITH ASYNCHRONOUS AND ISOCHRONOUS INTERFACE

(75) Inventor: Akira Koyama, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/553,563

(22) Filed: Jul. 19, 2012

(65) Prior Publication Data

US 2012/0281692 A1 Nov. 8, 2012

Related U.S. Application Data

(63) Continuation of application No. 12/331,144, filed on Dec. 9, 2008, now Pat. No. 8,249,061, which is a continuation of application No. 11/257,392, filed on Oct. 25, 2005, now Pat. No. 7,480,290, which is a continuation of application No. 09/545,888, filed on Apr. 7, 2000, now Pat. No. 6,987,758.

(30) Foreign Application Priority Data

Apr. 7, 1999 (JP) .................................. 11-100198

(51) Int. Cl.
H04L 12/66 (2006.01)
(52) U.S. Cl.
USPC .......................................... 370/356; 370/401
(58) Field of Classification Search
USPC .................................. 370/356, 401
See application file for complete search history.

(56) References Cited

U.S. PATENT DOCUMENTS

| | | | |
|---|---|---|---|
| 4,747,130 A | 5/1988 | Ho | |
| 5,386,413 A | 1/1995 | McAuley et al. | |
| 5,940,387 A | 8/1999 | Humpleman | |
| 6,049,539 A | 4/2000 | Lee et al. | |
| 6,144,411 A | 11/2000 | Kobayashi et al. | |
| 6,243,783 B1 | 6/2001 | Smyers et al. | |
| 6,249,570 B1 | 6/2001 | Glowny et al. | |
| 6,449,269 B1 | 9/2002 | Edholm | |
| 6,456,714 B2 | 9/2002 | Shima et al. | |
| 6,496,862 B1 | 12/2002 | Akatsu et al. | |
| 6,584,102 B1 | 6/2003 | Lu | |

(Continued)

FOREIGN PATENT DOCUMENTS

| | | |
|---|---|---|
| JP | 09-93250 | 4/1997 |
| JP | 09-224081 | 8/1997 |
| JP | 09-261364 | 10/1997 |

(Continued)

Primary Examiner — Melvin Marcelo
(74) Attorney, Agent, or Firm — Harrity & Harrity, LLP

(57) ABSTRACT

To provide a switching system with telephone switching function mainly on the basis of hardware processing by using isochronous channel which is a real time communication channel. The switching system comprises a gateway node connected with ISDN (Integrated Services Digital Network) and PSTN (Public Switched Telephone Network), and one or more extension nodes, and a serial bus such as IEEE 1394 bus. The gateway node transforms data rate of outside line into data rate of extension node, and the other way around, and secure a seamless communication channel. Concretely, the gateway node secures an isochronous channel, according to a request from the extension nodes or the outside line, and executes switching such as transfer or reservation. A resource manager holds a table for managing the gateway node and extension node.

20 Claims, 15 Drawing Sheets

(56) References Cited

U.S. PATENT DOCUMENTS

| | | | |
|---|---|---|---|
| 6,611,537 | B1 | 8/2003 | Edens et al. |
| 6,987,758 | B1 | 1/2006 | Koyama |
| 7,002,928 | B1 | 2/2006 | Smyers |
| 7,480,290 | B2 | 1/2009 | Koyama |
| 2001/0003526 | A1* | 6/2001 | Kanehara ............... 370/465 |
| 2004/0162110 | A1 | 8/2004 | Neuhaus |
| 2004/0258071 | A1* | 12/2004 | Thomas et al. ........ 370/395.4 |
| 2005/0013585 | A1 | 1/2005 | Ono |
| 2009/0092130 | A1 | 4/2009 | Koyama |

FOREIGN PATENT DOCUMENTS

| | | |
|---|---|---|
| JP | 10-51498 | 2/1998 |
| JP | 10-164548 | 6/1998 |
| JP | 10-173711 | 6/1998 |
| JP | 10-191463 | 7/1998 |
| JP | 11-102609 | 4/1999 |
| WO | WO 98/58475 | 12/1998 |

* cited by examiner

NETWORK SWITCHING SYSTEM WITH ASYNCHRONOUS AND ISOCHRONOUS INTERFACE

RELATED APPLICATIONS

This application is a continuation of U.S. patent application Ser. No. 12/331,144, filed Dec. 9, 2008, which is a continuation of U.S. patent application Ser. No. 11/257,392, filed Oct. 25, 2005, now U.S. Pat. No. 7,480,290, which is a continuation of U.S. patent application Ser. No. 09/545,888, filed Apr. 7, 2000, now U.S. Pat. No. 6,987,758, the entire contents of which are incorporated herein by reference.

BACKGROUND OF THE INVENTION

1. Technical Field of the Invention

The present invention relates to a switching method and equipment, wherein a serial bus is connected with extension nodes having asynchronous interfaces and isochronous interfaces for switching signals between an outside line and extension lines and between the extension lines

2. Description of the Prior Art

Conventionally, switching devices for home use are simple, because they are provided merely with an analogue or digital voice switch. Recently, however, information devices such as personal computers are introduced into the home, and digital broadcasting becomes popular. Therefore, there are growing needs for distributing image signal, data signal, voice and audio signal to an individual or to individuals simultaneously.

Therefore, asynchronous transfer mode (ATM) and local area network (LAN) such as Ethernet are improved for distributing time series data such as audio-visual signal.

Further, IEEE 1398 (IEEE Std. 1394-1995 IEEE Standard for a High Performance Serial Bus) is known by its real time and high speed performance, and plug-and-play capability. Therefore, IEEE 1394 can be used in a high speed network for multi-media signal into the home. IEEE 1394 applied to the home telephone is exemplified in FIG. 15. As shown in FIG. 15, digital voice signal 601 loaded on IP packet (Internet Protocol packet) 603 is transmitted by asynchronous transfer of IEEE 1394 toward a person on the other end of the line. Voice signal 601 is recovered by disassembling IP packet 603. Such a telephone system as explained above simply is called IP telephony defined by ITU-T H323.

However, ATM costs much, and Ethernet architecture can not guarantee the real time performance for a plurality of time series data streams.

On the other hand, home use switching equipment for voice, audio-video signals must be of low cost. In addition, it must have complete plug-and-play capability, when appliances are newly installed.

Actually, the IP telephony on IEEE 1394 as well as the IP telephony on the internet requires additional competent software, CPU, and hardware, such as codec for DSP (digital Signal Processing).

However, completely natural voice is hardly obtained in general by the IP telephony, because the time series data stream is processed by asynchronous system.

Further, in an advanced network, the plug-and-play capability is indispensable for automatic recognition of newly installed appliances.

Connection route is changed often or even stopped by a bus reset on IEEE 1394 for plug-and-play. However, the communication should not be interrupted by such a bus reset.

Furthermore, the communication quality should be maintained under fluctuations in data traffic.

Further, it is desirable to provide such an advanced network with API (Application Program Interface) compatible with various operating systems and protocols.

Further, each terminal can identify other terminals by their ID numbers under the plug-and-play circumstance.

Furthermore, it is desirable to provide a telephone equipment with such functions as master-slave communication, slave-slave communication, master-slave transfer, and slave-slave transfer.

SUMMARY OF THE INVENTION

An object of the present invention is to provide a switching method and system, wherein the telephone switching in the isochronous and asynchronous channels of IEEE 1394 is executed mainly by hardware.

A network switching system of the present invention exchanges stream data on a serial bus through a gateway between an outside line and an extension node, or between an extension node and the other extension node, wherein the extension node comprises:

control/memory unit for storing physical identifiers and telephone numbers of the gateway node and extension nodes and for controlling the network;

an asynchronous interface, for selecting the extension node and controlling a switching timing, connected with the control/memory unit;

a rate conversion unit for converting data rate of the stream data in the network into that in the outside line, or the other way around; and an isochronous interface, for transmitting and receiving the stream data, connected with the rate conversion unit.

A gateway of the present invention comprises a first switching unit for controlling extension nodes connected with a serial bus for isochronous transfer, and second switching unit for exchanging stream data between an outside line and the extension nodes, wherein:

the first switching unit comprises a bus manager connected with an aysnchronous interface and an isochronous interface; and the second switching unit comprises a line manager connected with a codec and a control/memory unit, wherein the line manager exchanges the stream data between the outside line and the extension line, according to a request from the bus manager, and the bus manager manages a call-in to the extension node and a call-out from the extension node.

An information terminal of the present invention comprises a telephone for transmitting and receiving telephone signal through a serial bus, a TV set for receiving TV signal through the serial bus, and a bus manager for controlling the serial bus, wherein the bus manager comprises two pairs of an aysnchronous interface and an isochronous interface for the telephone signal and the TV signal.

A gateway of the present invention comprises a telephone gate way and a TV gateway which are connected with a bus manager, wherein:

the telephone gateway transfers telephone signal from public switched telephone network to a serial bus, and the other way around;

the TV gateway receives TV signal from TV line, and transfer the TV signal to the bus manager; and the bus manager comprises two pairs of an asynchronous interface and an isochronous interface for transferring the telephone signal and the TV signal, respectively.

A call-in signal processing method of the present invention for a network switching system using asynchronous and isochronous transfer, wherein stream data on a serial bus are exchanged through a gateway between an outside line and an extension node, or between an extension node and the other extension node, which comprises the steps of:

selecting at the gateway which of an automatic transfer by number display, a global call-in, or a manual call-in on the basis of setup data;

calling one or more extension nodes;

securing one or more isochronous channels on the basis of responses from the extension nodes;

making the extension nodes start talking;

sending simultaneously call status of a station of which call status is changed, to all the extension node connected with the serial bus.

A call-out signal processing method of the present invention for a network switching system using asynchronous and isochronous transfer, wherein stream data on a serial bus are exchanged through a gateway between an outside line and an extension node, or between an extension node and the other extension node, which comprises the steps of:

receiving at the gateway a call-out from the extension node;

confirming at the gateway a call status of call object;

securing an isochronous channel for transmission;

sending the call status to all the extension nodes;

securing an isochronous channel for reception;

making the call object start talking, while sending, to the extension node which has made the call-out, such a call status that indicates the object does not respond, when the object does not respond;

releasing the isochronous channels for transmission and reception, when detecting an on-hook of the extension node which has made the call-out; and sending the call status to all the extension nodes.

In the above-explained present invention, any special hardware such as ATM switch is not employed. The switching system of the present invention employs a high speed serial bus such as IEEE 1394 and subscriber circuit for interfaces.

Therefore, according to the present invention, CPU memory remains small, because the present invention does not employ complex protocol such as IP (internet protocol).

CPU also remains small, because 64 Kbps PCM digital conversion means and the conversion hardware from 64 Kbps to 98.304, 199.0608, and 393.216 Mbps are employed.

Further, according to the present invention, voice is natural, because ISOCH channel is employed.

Further, according to the present invention, 64 Kbit data can be transmitted from the extension node by using the conventional 64 Kbit CODE, and the addresses are managed by a simple table by fixing the channel assigned at the time of the call-in and call-out.

Further, the data are transferred continuously even during the bus reset, by optimizing the buffer.

Further, various voice and image applications on various OSs and protocols are compatible with API (Application Program Interface).

In conclusion, according to the present invention, all the functions such as automatic identification of terminal functions, master-slave communication, slave to slave communication, and master to slave transfer can be implemented.

PREFERRED EMBODIMENT OF THE INVENTION

Figure 1:
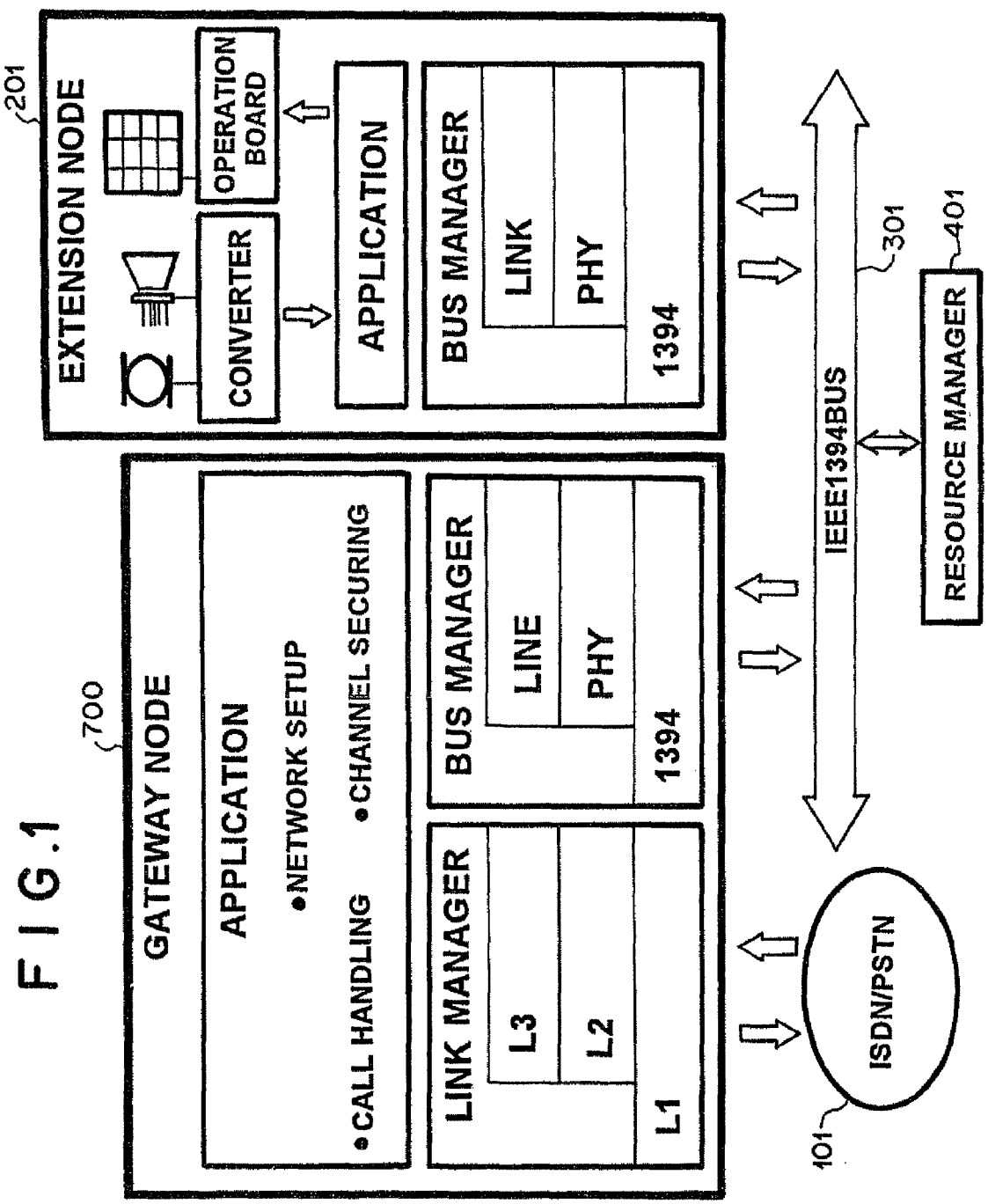
FIG. 1 is a block diagram of the switching system of the present invention.

Modes of embodiment of the present invention are explained, referring to the drawings.

A protocol stack of the exchange system is shown in FIG. 1. The exchange system of the present invention comprises gateway node 700 which is connected with a network such as a analogue line and ISDN (Integrated Services Digital Network), one or more extension nodes 201, and IEEE 1391 bus 301.

Extension node 201 which includes a voice node and a non-voice node is connected with the physical layer of bidirectional IEEE 1394 bus 301. Therefore, the number of extension nodes 201 are smaller than or equal to sixty-three, according to the IEEE 1394 protocol. Further, extension nodes 201 are equal on IEEE 1394 bus 301. Extension node 201 has its own protocol according to its own function. Extension node 201 can exchange information data and control data with another extension node 201 which has the identical protocol. Further, extension node 201 can recognize a bus reset due to addition or deletion of terminal, or dissolution of trouble.

Gateway 700 includes a rate conversion means for converting the outside/extension data transfer rates in order to provide call channels for seamless communication between the outside line and extension line. Further, in response to requests from outside line or extension line, gateway 700 grasps network status, and secures network resource, particularly the isochronous (ISOCH) channel as call channel. Furthermore, gateway 700 switches lines for transferring or holding under requests from outside or extension lines.

The normal or long distance standard in IEEE 1394 are employed for IEEE 1394 bus 301.

Communication channels by a various means such as ISDN S-IF, CATV, ADSL (Asymmetric Digital Subscriber Line) and ATM (Asynchronous Transfer Mode) are used for outside line 101 connected with gateway 700.

Resource manager 401 prepares a control table for controlling extension node 201 and gateway node 700. The control table is exemplified in FIG. 2. Simplified exchange number as shown in FIG. 2 is a number fixed to the physical layer.

Figure 2:
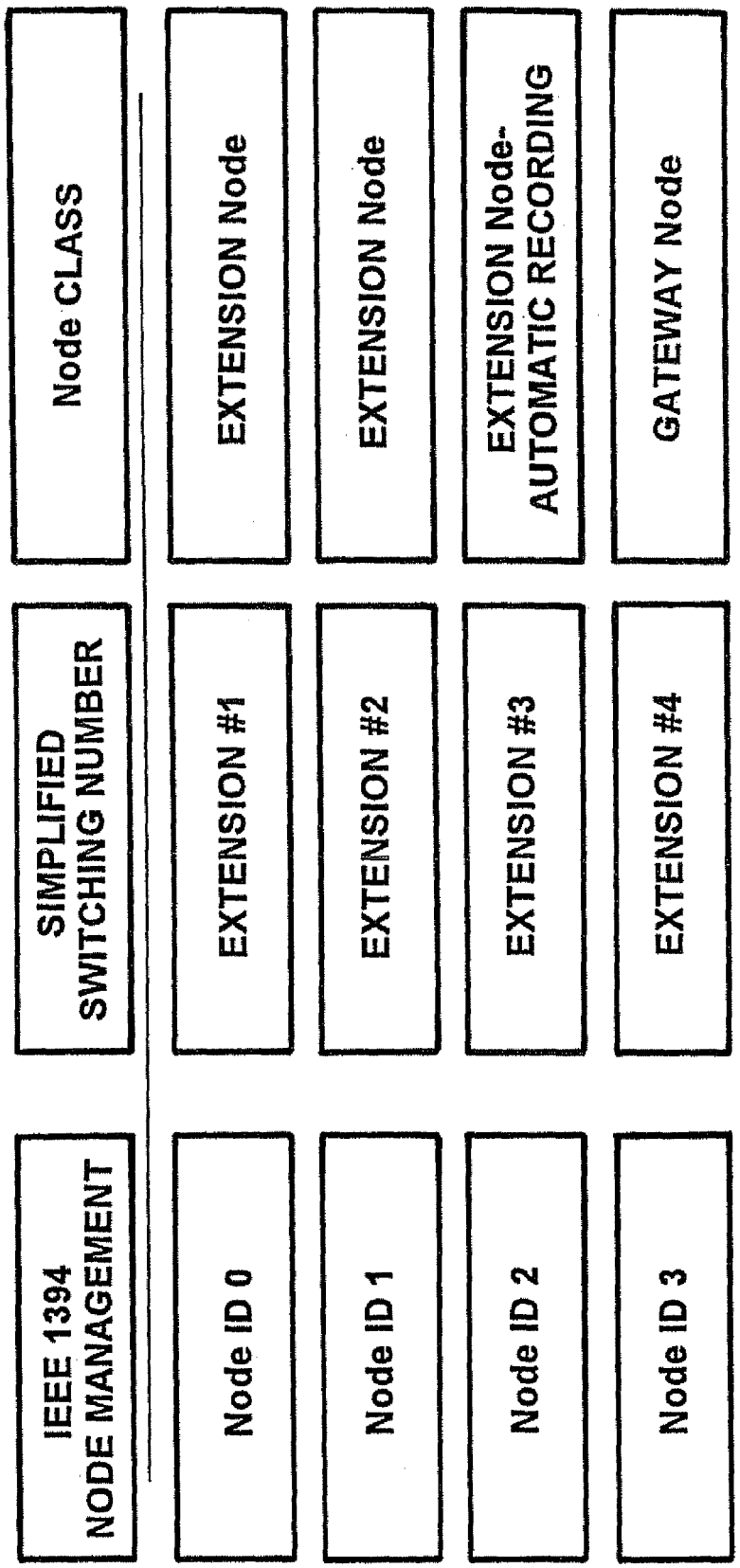
FIG. 2 is an example of a table for managing a gateway node and extension nodes.

IEEE 1394 node control as shown in FIG. 2 is executed every node ID (identifier) in such a manner that gateway node 700 and extension node 201 can refer to the simplified exchange number and the node class through IEEE 1394 bus 301.

When a bus reset occurs, the node ID is changed, according to the Tree Identify process and the Self Identify process. In this case, resource manager 401 rewrites the control table and notifies each extension node 201 of that change.

Node class is classified by its function into voice class, gateway class, and dataless class. A relay, for example, belongs to the dataless class. Further, an automatic recording function during absence in the voice class is indicated by suffix. These classes are identified by a non-shown exchange setup program.

Figure 3:
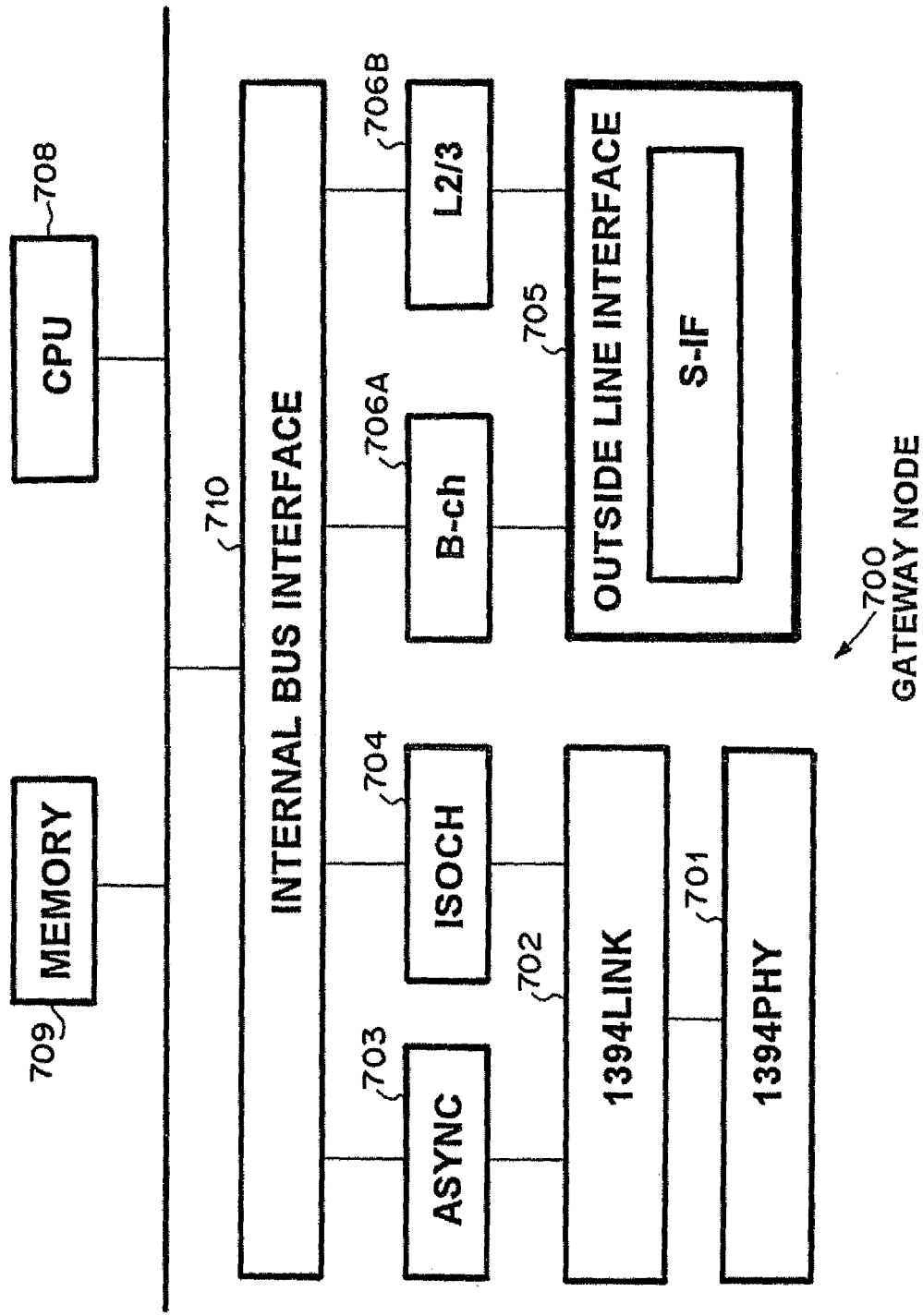
FIG. 3 is a block diagram of a hardware of the gateway node.

A hardware block diagram of gateway node 700 is shown in FIG. 3. IEEE 1394 bus 301 is connected with physical layer device 701 which is further connected through link layer device 702 with both asynchronous (ASYNC) interface 703 and isochronous (ISOCH) interface 704. Both ASYNC interface 703 and ISOCH interface 704 are connected through internal bus interface 710 with memory 709 and CPU 708. Gateway node 700 as shown in FIG. 3 inputs and outputs outside line signal by using outside line interface such as S-IF to and from memory 709 and CPU 708. B-ch indicated as 706A and ISDN layer 2/layer 3 indicated as 706B are exemplified in FIG. 3.

Figure 4:
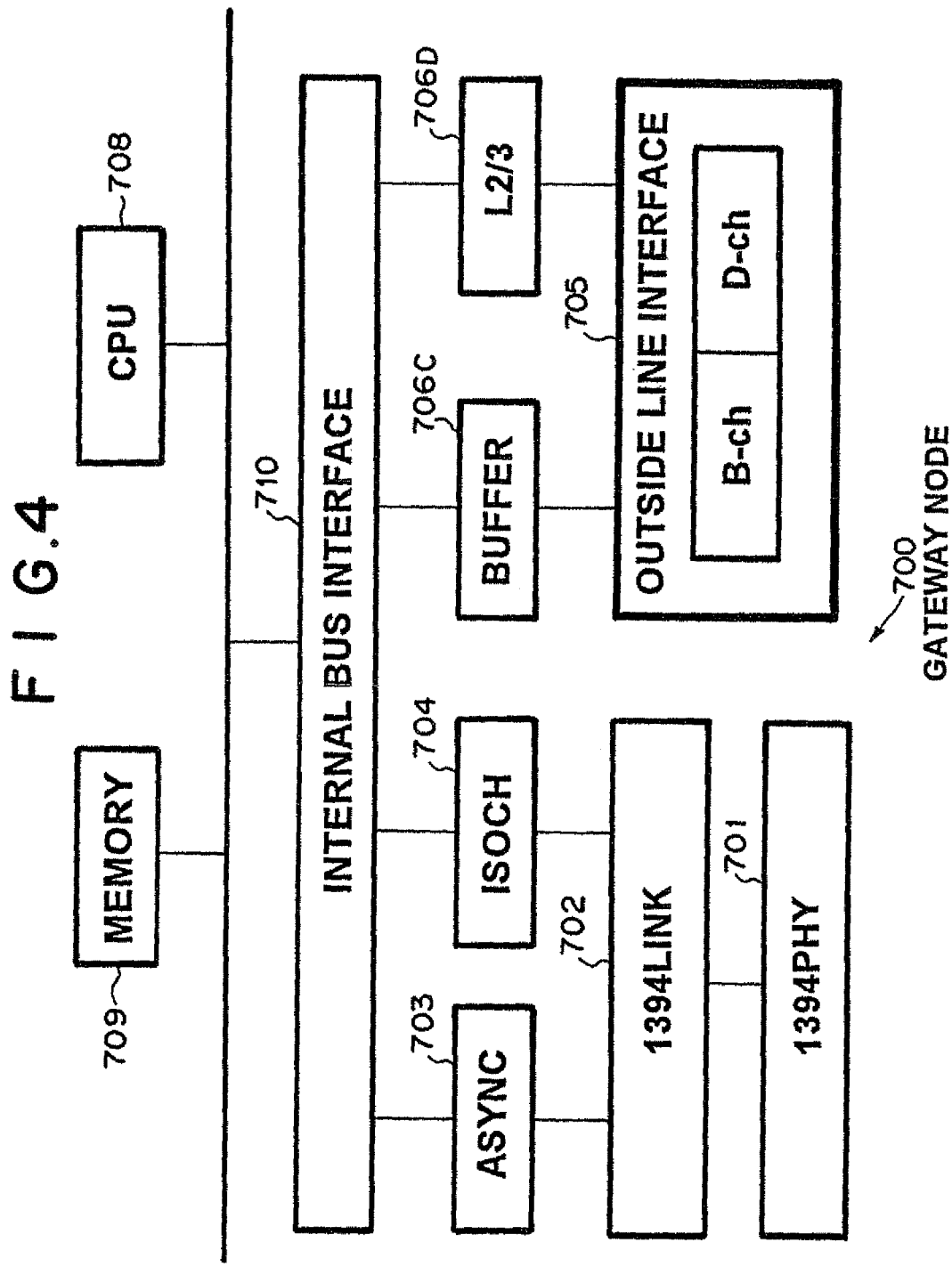
FIG. 4 is a block diagram of the gateway node connected with ISDN (Integrated Services Digital Network).

A block diagram of another gateway node 700 connected with ISDN is shown in FIG. 4, wherein outside line interface 705 includes two information channels indicated as B-ch and control channel indicated as D-ch. Buffer 706C as shown in FIG. 4 buffers signals as much as two information channels indicated as B-ch.

Gateway node 700 as shown in FIG. 3 or 4 is provided with non-shown exchange setup program.

Concretely, CPU 708 as shown in FIG. 3 or 4 accepts setup registration of reception mode and stores it in memory 709 beforehand. The setup registration is sent to CPU 708 10 from extension node 201 through physical layer 701, link layer 702, ASYNC interface 703, and internal interface bus 710. Here, the reception mode is selected by using operation board such as ten key and is stored in memory 709. The reception mode may be, for example, a mode for calling extension node 201 with or without limiting call originators, a mode for recording the voices automatically with or without limiting call originators.

When there is a call-in from ISDN, gateway 700 as shown in FIG. 3 or 4 detects the number of the call originator from D-ch through outside line interface 705, and inspects, by using CPU 708, whether the object node is busy, idle, or absent.

When the termination node or the object node is busy, CPU 708 waits for an end of call.

On the other hand, when the termination node is idle, CPU 708 controls ASYNC interface 703, secures a bidirectional ISOCH channel, and send the secured channel number to extension node 201. Then, afterward, ISOCH interface 704 is activated under the control by CPU 708, thereby starting talking through the secured channel.

Further, when the termination node is absent, CPU 708 controls similarly ASYNC interface 703, secures a bidirectional ISOCH channel, and send to extension node 201 the secured channel number, recording ready signal, and recording identifier. Here, the recording identifier may includes a simplified exchange number, time, and serial number, whereby extension node 201 can record automatically the voice through gateway 700 from ISDN.

Figure 5:
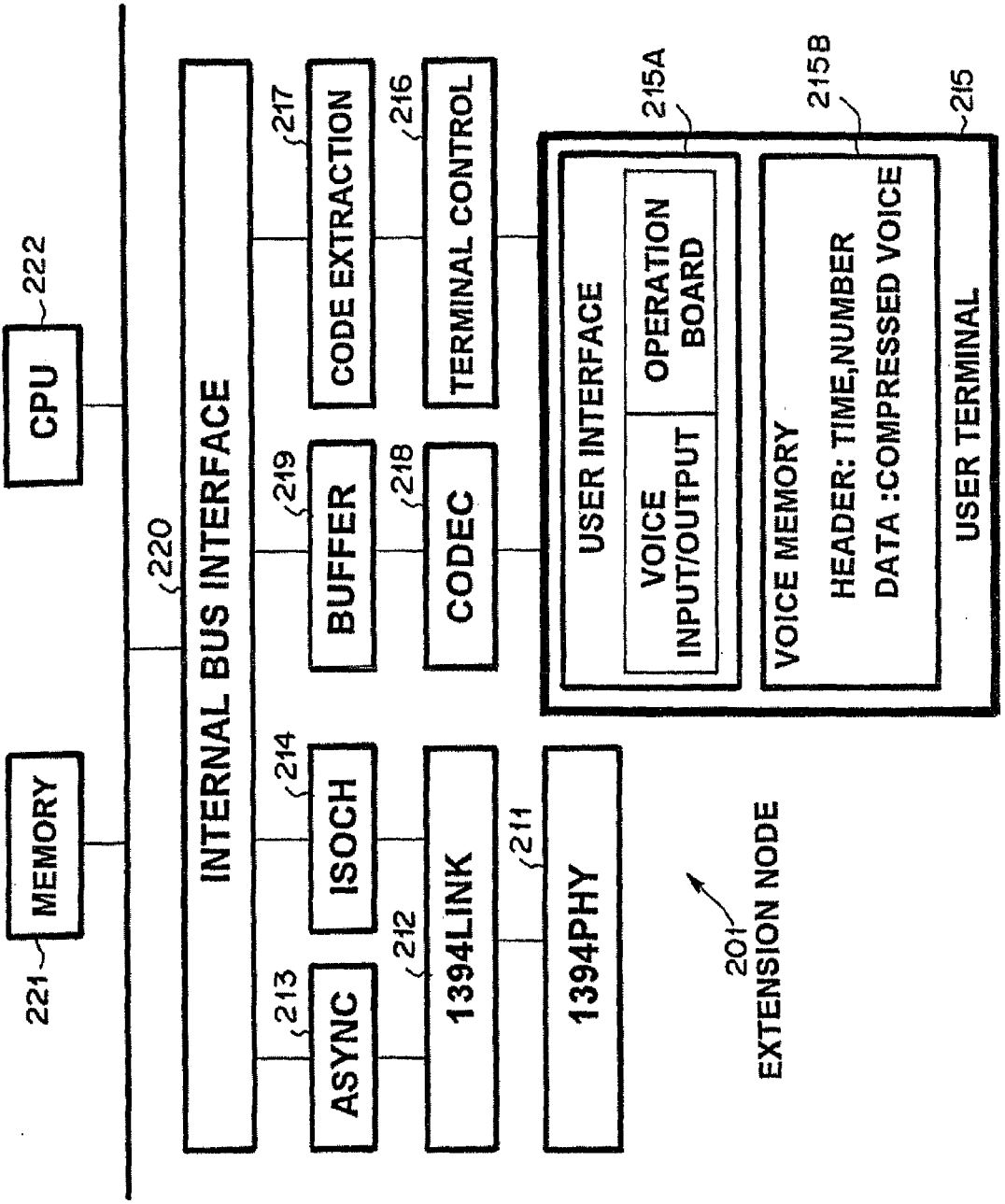
FIG. 5 is a block diagram of a hardware of the extension node.

A hardware block diagram of extension node 201 is shown in FIG. 5. IEEE 1394 bus 301 is connected through physical layer device 211 and link layer device 212 with both asynchronous (ASYNC) interface 213 and isochronous (ISOCH) interface 214. Both ASYNC interface 213 and ISOCH interface 214 are connected through internal bus interface 220 with memory 221 and CPU 222. Extension node 201 further comprises user terminal 215.

User terminal 215 further comprises user interface 215A including an operation board and voice input/output apparatus such as a microphone and a speaker, and voice memory 215B for automatic recording during absent time. User terminal 215 may comprises a display for receiving visual signals.

The output/input signal from/to user interface 215A is inputted or outputted to/from memory 221 and CPU 222 through CODEC 218, buffer 219, and internal bus interface 220. The output/input signal from/to the operation board is inputted or outputted to/from memory 221 and CPU 222 through terminal controller 216, code extraction unit 217, and internal bus interface 220. The output/input signal from/to user interface 215B is inputted or outputted similarly.

Extension node 201 transmits and receives the control signal of code extraction unit 217, executes media stream transform of data such as voice data, controls the operation board in user interface 215A, and drives the speaker. The voice data may be coded by CODEC 218 and is sent to buffer 219 every 8 kHz sampling.

When the automatic recording at absent time is executed, a header including the recording identifier is received through code extraction unit 217, a media stream of voice data is transformed by CODEC 208. Finally, the voice and the originator number and time stamp in the received header are stored in voice memory 215A.

Next, the communication from an extension node 201 to the other extension node 201 or to the outside line is explained. In this case, CPU 222 inspects, on the basis of call operation by the operation board in user interface 215A, whether the termination node 201 or gateway 700 is busy, idle, or absent.

When the termination node 201 or gateway 700 is idle or absent, CPU 222 send a call request through ASYNC interface 213. In case of extension to extension communication, CPU 222 secures an ISOCH channel for a stream channel immediately after sending the call request, and send the secured channel number to the termination node 201. In case of extension to outside communication, CPU 222 further send the outside line number through gateway 700. Then, CPU 222 sends a call request to the outside line through gateway 700. Then, CPU 222 secures an ISOCH channel for a stream channel between extension node 201 and gateway 700.

Figure 6:
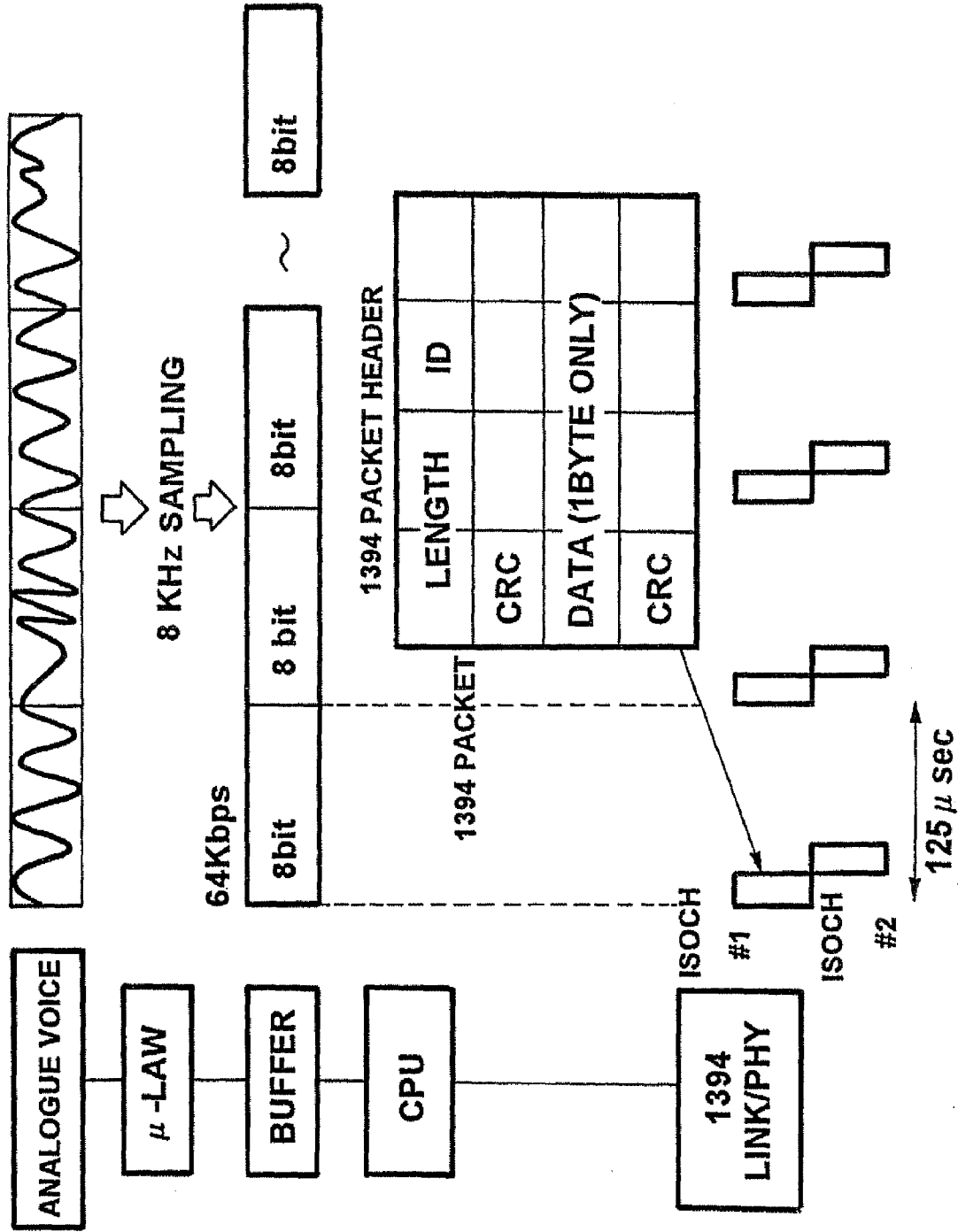
FIG. 6 is an illustration of signal conversion between voice/ISDN and IEEE 1394.

Signal conversion from voice/ISDN signal in the extension node into IEEE 1394 signal in the network is illustrated in FIG. 6. Analogue voice signal is sampled at 8 kHz by CODEC 218, coded by μ-LAW, buffered by buffer 219, and sent through CPU 222 to IEEE 1394 link layer. Voice signal is received in the direction reverse to the above-explained procedure. It is desirable that buffer 219 has a capacity sufficient enough to output the voice signals collectively, even when IEEE 1394 bus stops and resumes.

Figure 7:
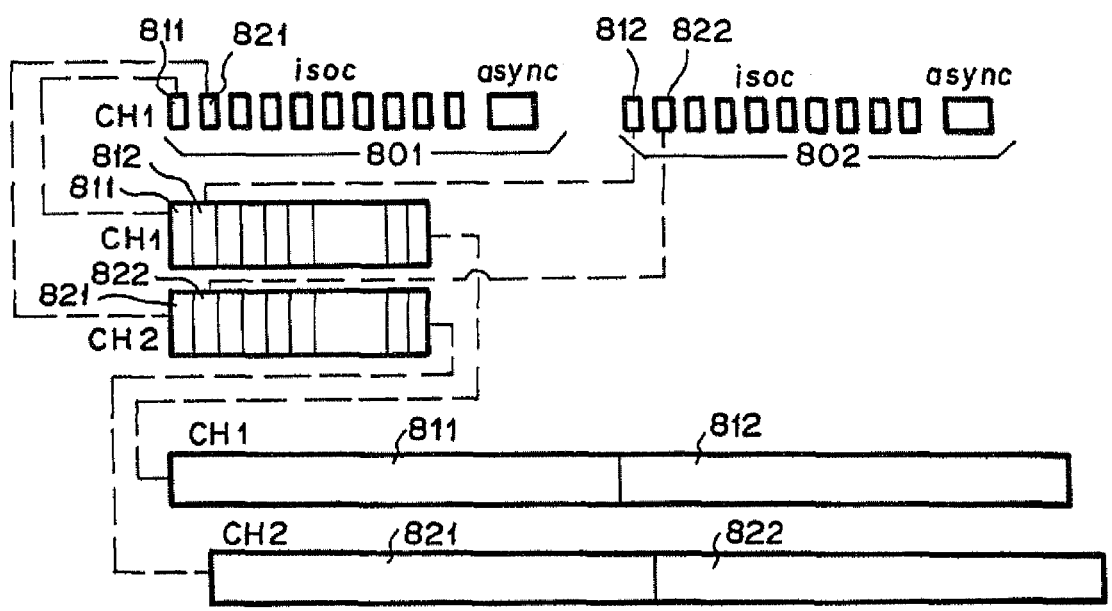
FIG. 7 is an illustration of IEEE 1394 packet.

IEEE 1394 packet signals and distributions thereof are illustrated in FIG. 7. Time slots of 5 μsec 801 and 802 contains ISOCH channels 811, 821, 812, and 822. For, example, a first node is assigned to channel 1 of which first and second time slots are time slots 811 and 812, respectively. Likewise, a second node is assigned to channel 2 of which first and second time slots are time slots 821 and 822, respectively. Data allocated to these time slots are converted into analogue signal by CODEC 208, and outputted from a speaker of user terminal 215. The voice signal inputted into a microphone is processed in the direction reverse to the above-mentioned procedure for the speaker output.

In the present invention, synchronous interface may be, for example, an interface for isochronous (ISOCH) transfer.

Figure 8:
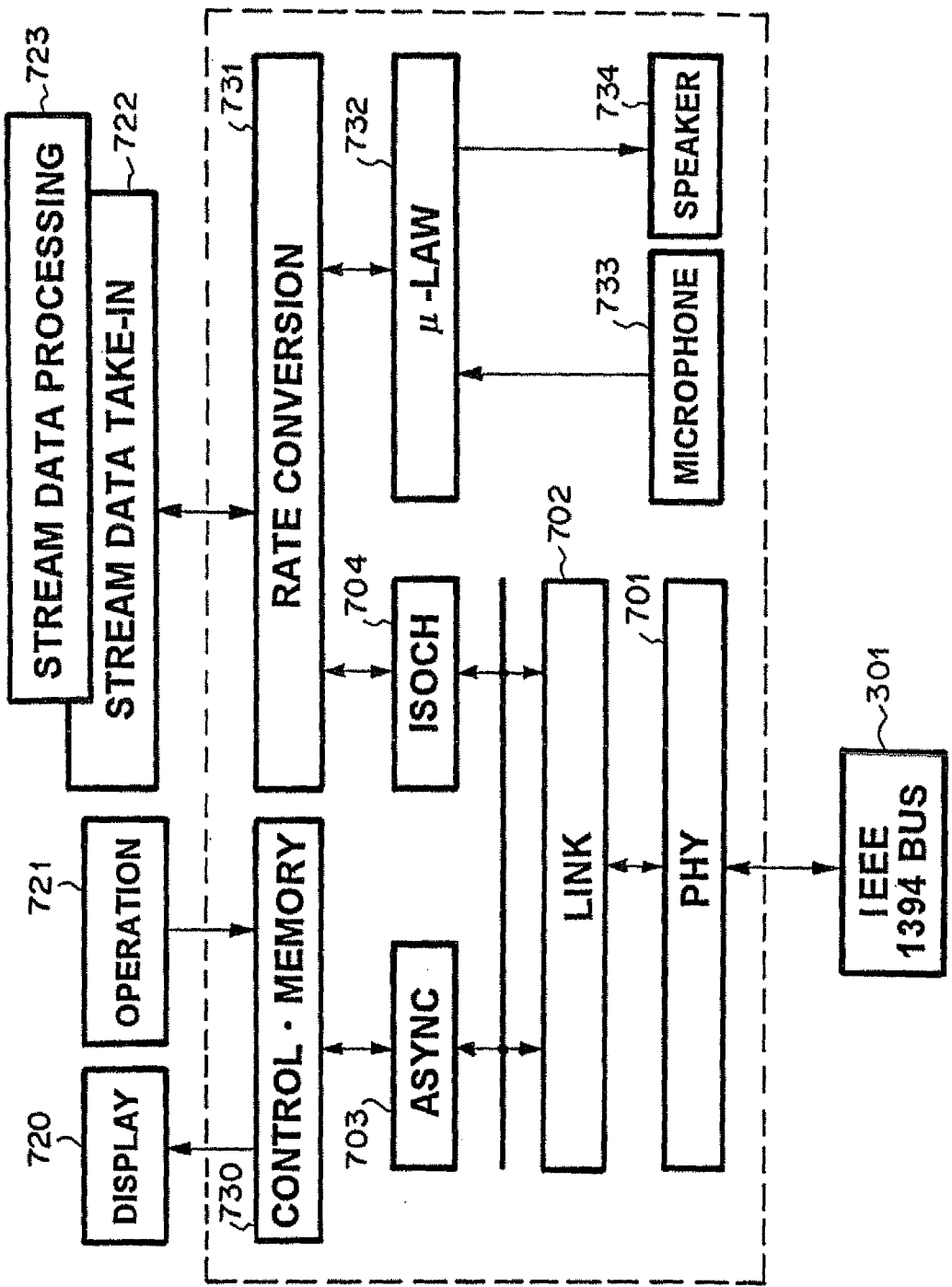
FIG. 8 is a block diagram of an extension node which transmits and receives voice signal only.

A block diagram of an extension node 201 exclusively used for voice signal is shown in FIG. 8.

IEEE 1394 bus 301 is connected with ASYNC interface 703 and ISOCH interface 704 through physical layer device 701 and link layer device 702.

ASYNC interface 703 connected with control/memory unit 730 selects a channel in the network and controls signal timings. Control/memory unit 730 stores network status by using reference means such as a table of physical ID and telephone number. Display unit 720 and operation unit 721 which are connected with control/memory unit 730. Display unit 720 displays network status on the basis of data from control/memory unit, while operation unit 721 accepts telephone number input.

ISOCH interface 704 outputs voice at 100 to 400 MHz every 125 μ sec, at real time, without re-transmitting, even when some errors have occurred. The outputted voice signal is converted into 64 Kbps ISDN signal by rate conversion means 731, processed by μ LAW/CODEC 732, and outputted from speaker 734. Reversely, voice signal inputted into microphone 733 is transferred to μ LAW/CODEC 732.

Further, stream data processing means 723 connected with stream data input means 722 connected with rate conversion means 731 data format of the voice signal and stores it in a non-shown memory.

Figure 9:
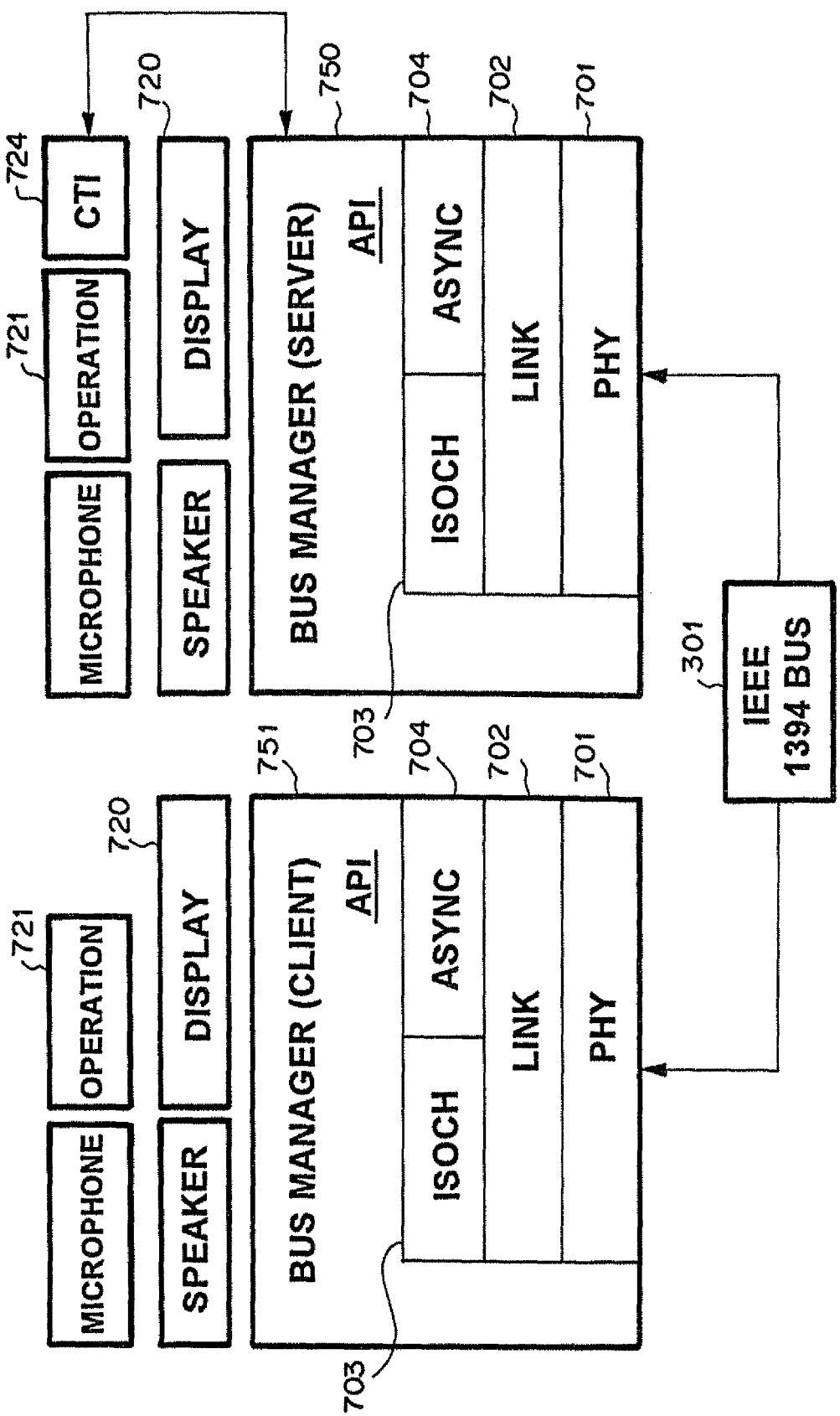
FIG. 9 is a block diagram of the protocol stack for extension-extension communication by voice only.

A protocol stack of extension to extension communication is shown in FIG. 9. Here, the extension nodes are used exclusively for voice signal.

Bus managers 750 and 751 as switching equipments are mounted on ASYNC interface 703 /ISOCH interface 704 on link layer 702 on physical layer 701. Bus managers 750 and 751control voice interface, rate conversion, and call information Concretely, bus managers 751 for client and 750 for server control by using a common manner for the client and server microphone/speaker, operation board, 721, and display 720.

Particularly, CTI 724 (Computer Telephony Integration) of bus manager 750 for server controls connection and operation of terminals such as user terminal 215 as shown in FIG. 5, stores the control information, executes notification to all the terminals, and accepts calls/requests from the terminals. Here, the control information stored in CTI 724 includes a correspondence table between the physical IDs of IEEE 1394 and actual telephone number of the terminals. CTI 724 resumes communication line instantly, by reading out the correspondence table, when the bus is reset.

The intermission of communication caused by the bus reset due to Plug and Play is minimized, because CTI 724 always make each terminal rewrite every change in the correspondence table so as to restore the connection merely by notifying the terminal of the change of the physical ID due to the Plug and Play.

Figure 10:
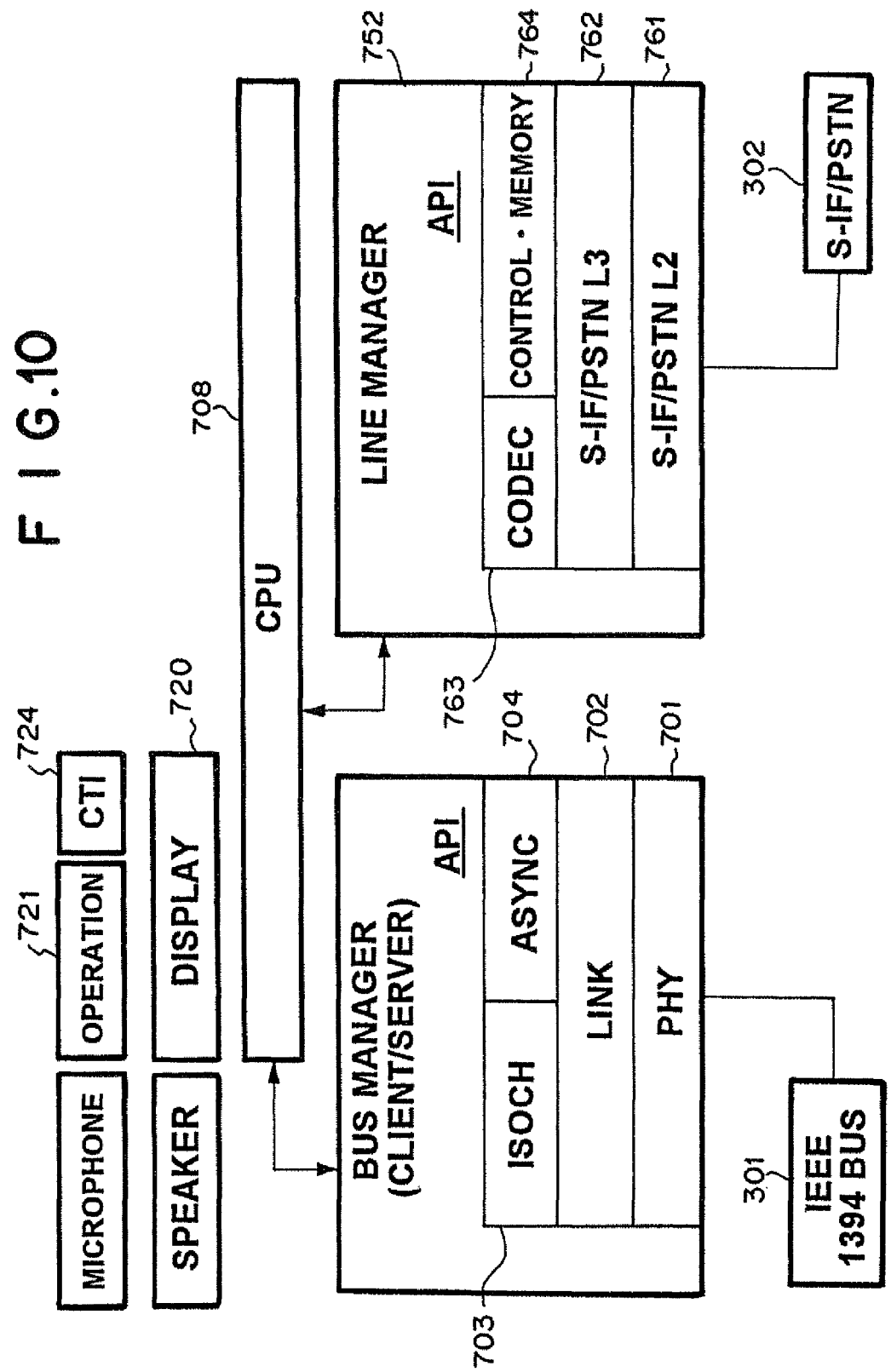
FIG. 10 is a block diagram of gateway node connected with PSTN (Public Switched Telephone Network).

A block diagram of gateway 700 connected with PSTN (public switched telephone network) is shown in FIG. 10. IEEE 1394 interface including bus manager manages connection with IEEE 1394 bus 301 and executes voice processing, while ISDN/analogue outside line interface connects digital voice stream through API (application program interface) of bus manager with S interface of ISDN (S-IF) or the analogue interface.

CPU 708 converts protocols for connecting IEEE 1394 bus 301 and S-IF/PSTN 302. Concretely, address conversion between IEEE 1394 bus ID and telephone number, data conversion between high speed data on IEEE 1394 bus 301 and low speed data on PSTN 302.

Line manager 752 accepts call-out from the bus manager and call-in from the outside line. Line manager 752 connects the call-in with extension node 201. Conventional hardware/software are employed for lower layers L2 (761) and L3 (762), CODEC 763, and control/memory unit 764.

Figure 11:
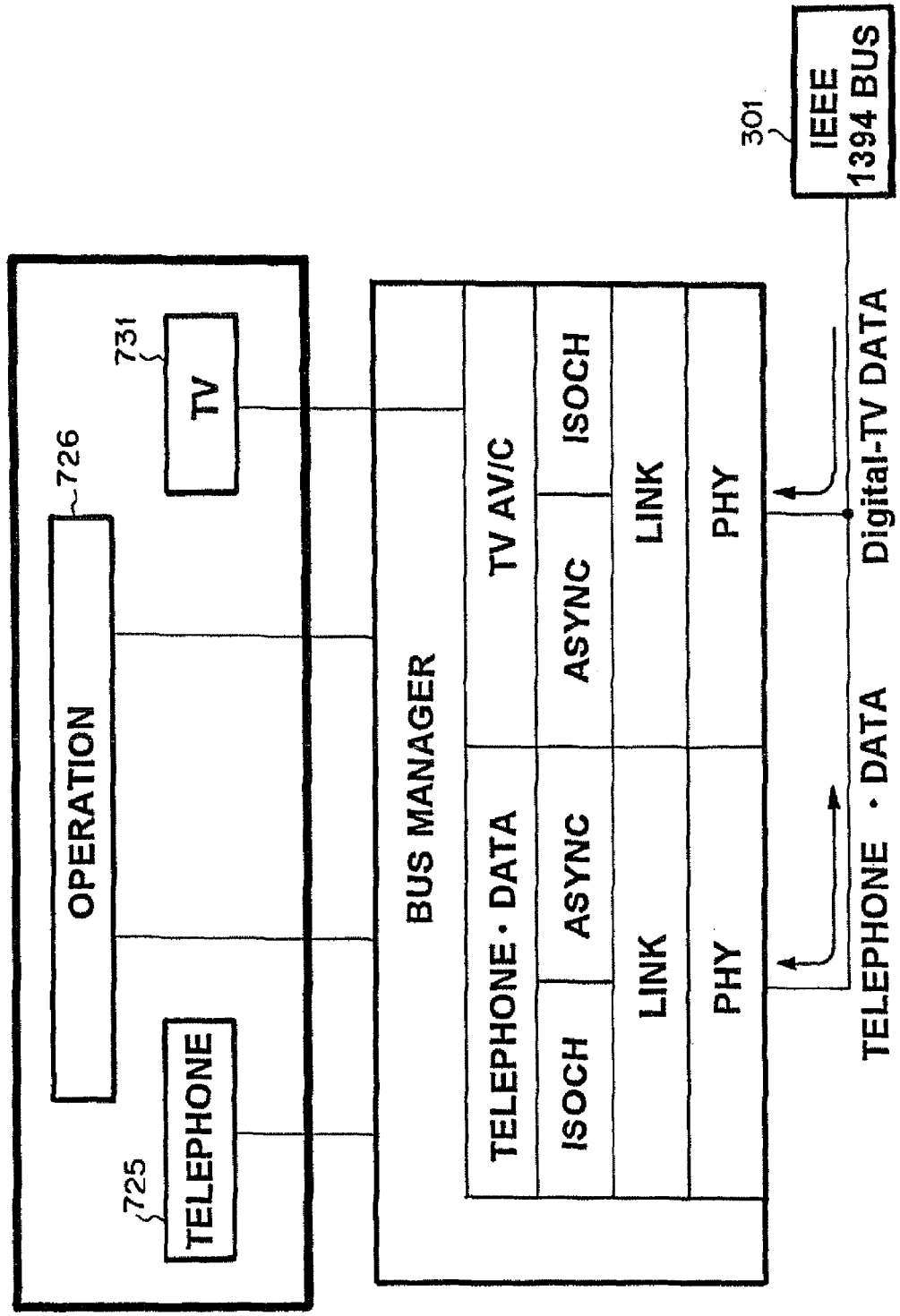
FIG. 11 is a block diagram of an extension node for voice and visual signal.

A block diagram of extension node 201 for telephone data and TV data is shown in FIG. 11. Operation board 726 controls telephone 725 and TV 731. All the data from operation board 726 is sent to gateway 700 through bus manager and ASYNC channel. For example, billing information for digital TV is sent through ASYNC channel as telephone data.

Figure 12:
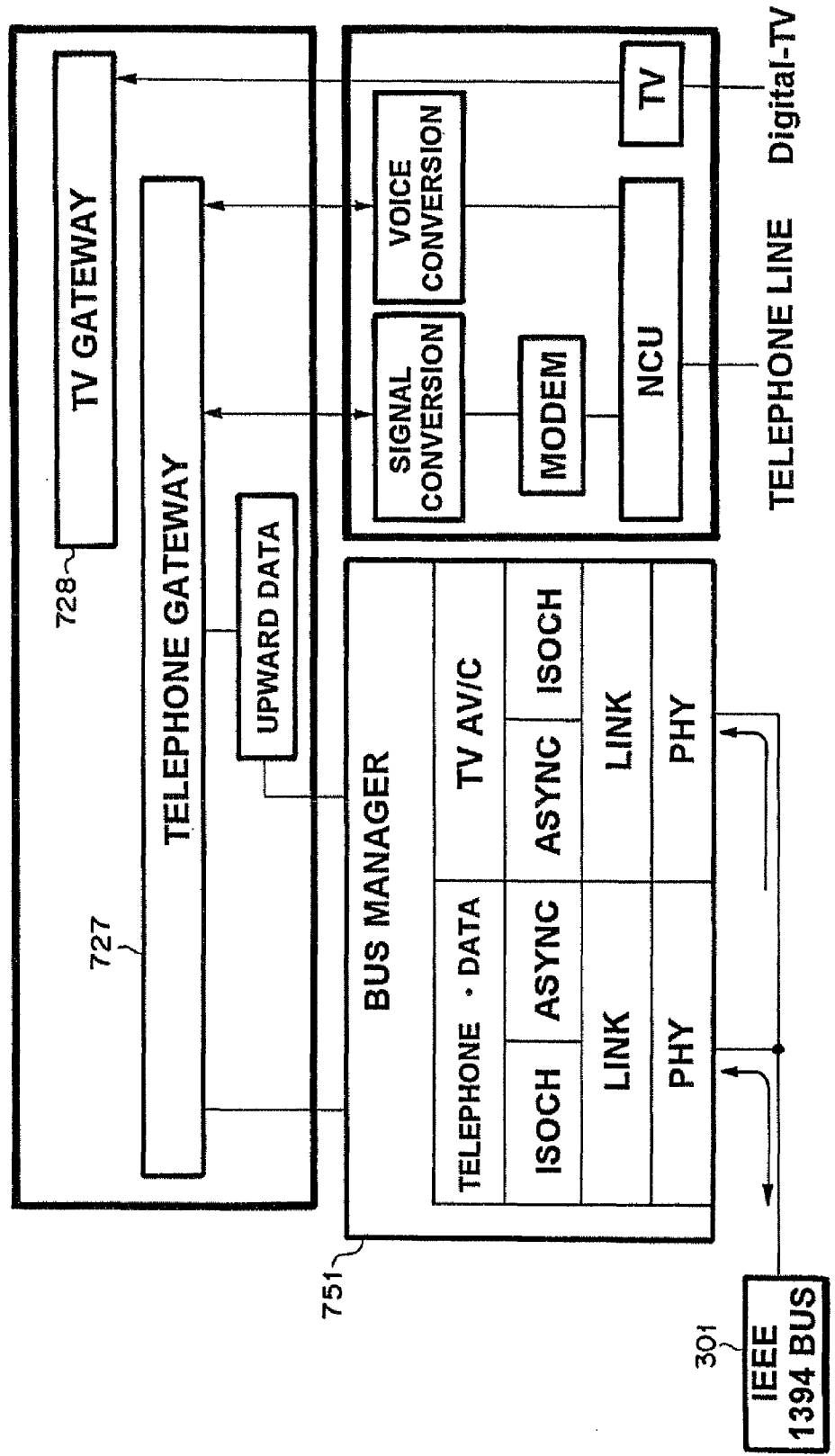
FIG. 12 is a block diagram of residential gateway provided with a telephone gateway and a TV gateway.

A block diagram of gateway node 700 for telephone data and TV data is shown in Fig. 12. Telephone gateway 727 connects NCU (Network Control Unit) with IEEE 1394 bus 301, while TV gateway 728 connects digital TV with IEEE 1394 bus 301. Operational data for controlling terminals and server are sent through ASYNC channel to IEEE 1394 bus 301. For example, the billing information for digital TV is one of the operational data of telephone. Telephone gateway 727 and TV gateway 728 are included in CPU 708 as shown in FIG. 3.

TV signal stream on IEEE 1394 bus 301 is outputted on non-shown TV display through physical layer, link layer, ASYNC interface, ISOCH interface, and TV-AVF/C (TV-Audio Visual signal controller).

TV-AV signal may be MPEG (Moving Picture Expert Group of ISO/IEC) picture, while TV hardware may include STB (set top box).

Figure 13:
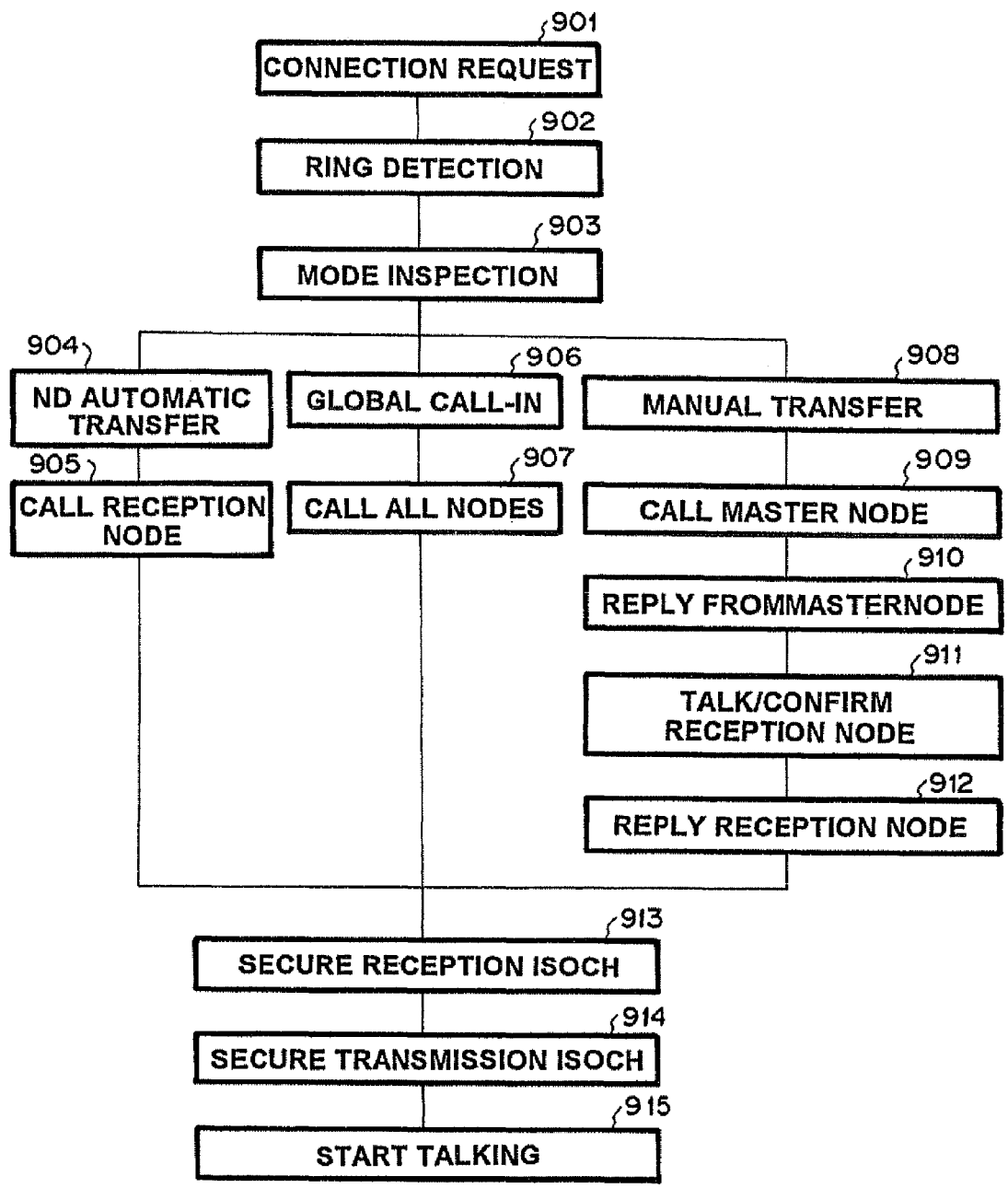
FIG. 13 is a flow chart of call-in process.

A flow chart of the call-in operation is shown in FIG. 13. A call-in accepted by S-IF or PSTN interface 761 is received as a connection request at step 901. The call-in from analogue line is detected at ring detection at step 902. Then, at step 903, CPU 708 selects either one of the three modes; automatic transfer by ND (number display), global call-in for all the extension nodes, or manual call-in to an object extension node.

In case of the automatic transfer by ND at step 904, an ISOCH channel is selected on the basis of ND number, prescribed numbers to be transferred, and extension data.

In case of the global call-in at step 906, call signals to all the terminals are sent through ASYNC interface 704.

In case of the manual transfer at step 908, a call signal is sent to a switching node or prescribed terminal, on the basis of an instruction from operation board 721.

After selecting the mode, CPU 708 decides to connect the call-in with extension node 201, or to reply "busy" to the outside line, depending upon the status signals periodically sent from all the extension nodes 201.

When CPU 708 confirms a reply from extension node 201, CPU 708 secures ISOCH channel for extension node 201 and ISOCH channel for the outside line at step 914, thereby starting communication at step 915. ISOCH channels are secured till the end of call.

Further, when the call status is changed in extension node 201, the status change is notified simultaneously and directly to all the extension nodes 201 with telephone terminals. Here, the call status is a signal indicating whether a node is busy or idle.

Figure 14:
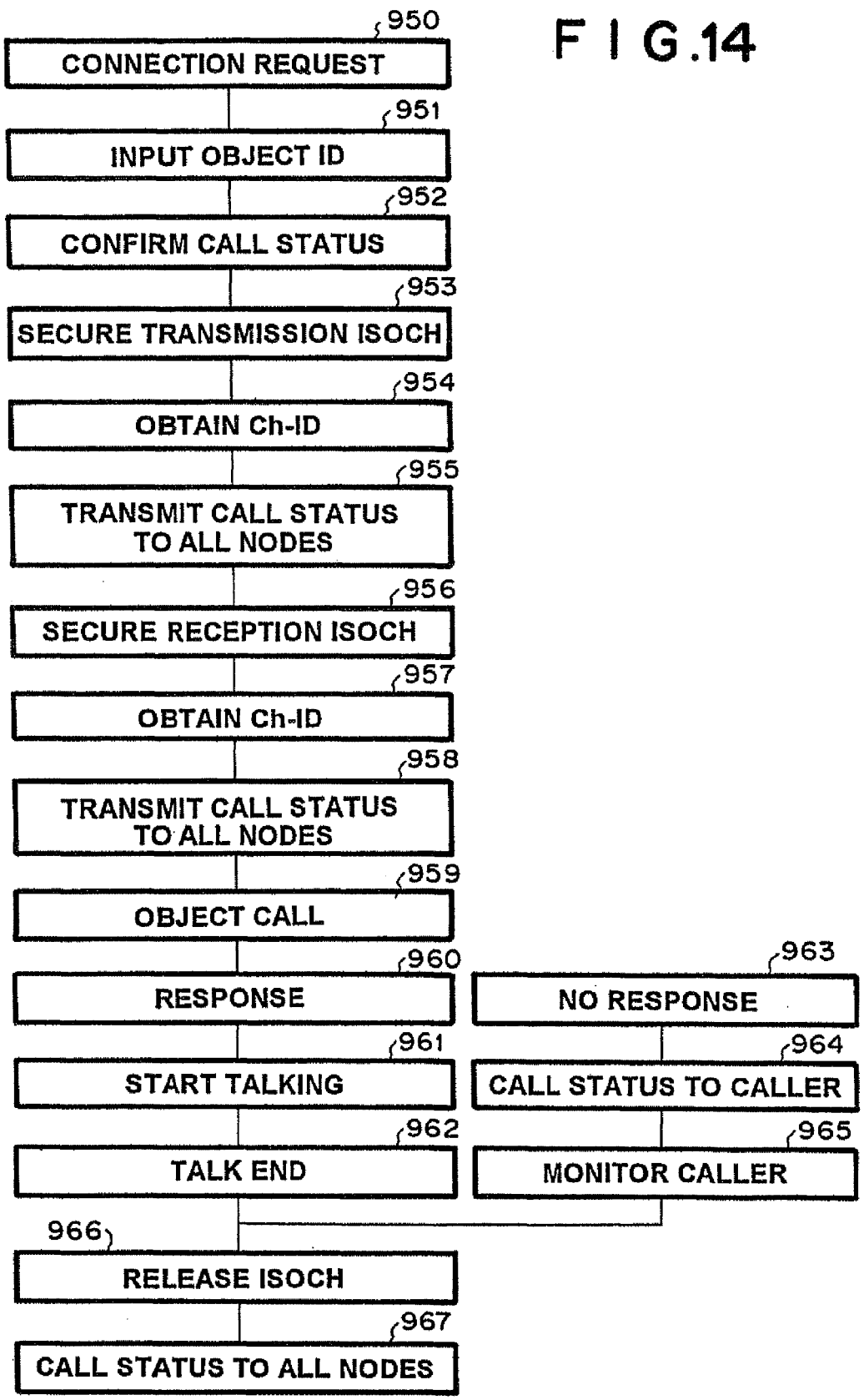
FIG. 14 is a flow chart of call-out process.
Figure 15:
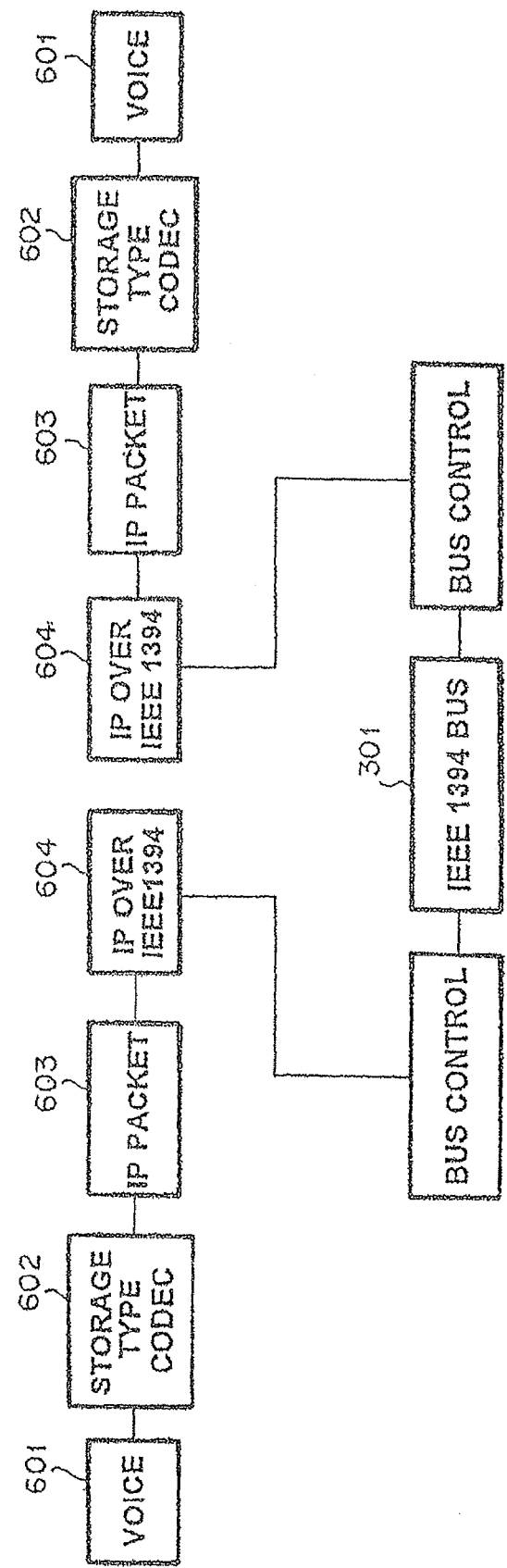
FIG. 15 is a block diagram of a conventional IP (Internet Protocol) telephony.

A flow chart of call-out from an extension to the other extension or an outside line is shown in FIG. 14. Connection is requested by connection request at step 950 and by inputting an object telephone number or object ID at step 951. The object ID is an object extension number, or an object outside line number together with prescribed number for calling out the outside line. When gateway node 700 accepts the connection request, it confirms the call status at step 952. When the object is idle, ISOCH channel for transmission is secured at step 953, and Ch-ID is secured at step 954. Further, the call status is sent to every node at step 955. Likewise, ISOCH channel for reception is secured at step 956, Ch-ID thereof is secured at step 957, and the call status is sent to every node at step 958. Then, at step 959, the call-out signal is sent to the object through ASYNC channel. When the object replies, communication is started through ISOCH channel. On the other hand, when the object does not reply, call signal is sent repeatedly, and a call status indicating that the object does not reply is sent to the node which requests the call-out. When the call-out is ended successfully at step 962, or when on-hook by the node which requests the call-out is detected due to at step 965, ISOCH channel is released at step 966, and call status is sent to every node.

As explained above, ISOCH channel is secured every call.

Every call transmits one packet of maximum 16 Bit voice data every cycle within 1 μsec of ISOCH transfer.

The hardware necessary for the exchange system of the present invention includes CODEC for voice signal and rate conversion device together with physical layer device and link layer device.

The API in the present invention feed the high bit rate voice data on IEEE 1394 into the processing unit.

The terminals of the present invention store the latest status, because the status change in a terminal is immediately notified to all the terminals. Therefore, the latest status can be confirmed before bus reset and call. Particularly, busy status of the object can be confirmed before the beginning of ISOCH transfer.

What is claimed is:

1. A device comprising:
one or more processors to:
receive a request to establish a connection for transmitting voice signals between a first extension node and a second extension node, at least one of the first extension node or the second extension node being connected to the device via a serial bus,
secure, based on the request, a bidirectional isochronous channel, and
transmit information identifying the bidirectional isochronous channel to one of the first extension node or the second extension node to enable the connection to be established.

2. The device of claim 1, where the one or more processors are further to:
determine that the connection is associated with a telephone number of the first extension node,
convert the telephone number to an identifier associated with the first extension node, and
notify, via the serial bus, each of a plurality of other extension nodes connected to the serial bus, of the established connection between the first extension node and the second extension node using the identifier.

3. The device of claim 1, where the one or more processors are further to:
determine an occurrence of a reset of the serial bus,
determine a change to an identifier associated with the at least one of the first extension node or the second extension node that is caused by the occurrence of the reset of the serial bus,
transmit, via the serial bus and to the at least one of the first extension node or the second extension node, information identifying the change to the identifier to prevent a transmission of the voice signals from being interrupted.

4. The device of claim 3, where the occurrence of the bus reset is caused by a connection of a third extension node to the serial bus.

5. The device of claim 1, where the one or more processors are further to:
determine a change to an identifier associated with the at least one of the first extension node or the second extension node,
transmit, via the serial bus and to the at least one of the first extension node or the second extension node, information identifying the change to the identifier to prevent a transmission of the voice signals from being interrupted.

6. The device of claim 1, where the first extension node and the second extension node are connected to the serial bus, and where the one or more processors are further to:
determine a state of the first extension node based on receiving the request,
update control information based on the determined state, and
transmit, prior to the connection being established, information identifying the updated control information to the first extension node and the second extension node.

7. The device of claim 1, where the one or more processors are further to:
determine a termination of the connection, and
release the bidirectional isochronous channel based on the termination of the connection.

8. A method comprising:
receiving, by a network device, a request to establish a connection for transmitting voice signals between a first extension node and a second extension node, the first extension node being connected to the network device via a serial bus;
securing, by the network device, a bidirectional isochronous channel based on the request; and
transmitting, by the network device, information identifying the bidirectional isochronous channel to the first extension node to enable the connection to be established.

9. The method of claim 8, further comprising:
determining that the connection is associated with a telephone number of the first extension node;
converting the telephone number to an identifier associated with the first extension node; and
notifying, via the serial bus, each of a plurality of extension nodes connected to the serial bus, of the established connection between the first extension node and the second extension node using the identifier,
the plurality of extension nodes including the first extension node and the second extension node.

10. The method of claim 8, further comprising:
determining an occurrence of a reset of the serial bus;
determining a change to an identifier associated with the first extension node,
the change to the identifier being caused by the occurrence of the reset of the serial bus;
transmitting, via the serial bus and to the first extension node, information identifying the change to the identifier to prevent an interruption of a transmission of the voice signals.

11. The method of claim 10, where the occurrence of the bus reset is caused by a connection of a third extension node to the serial bus.

12. The method of claim 8, further comprising:
determining a change to an identifier associated with the first extension node, and
transmitting, via the serial bus and to the first extension node, information identifying the change to the identifier to prevent a transmission of the voice signals from being interrupted.

13. The method of claim 8, where the first extension node and the second extension node are connected to the serial bus, the method further comprising
determining a state of the first extension node based on receiving the request; and
transmitting, prior to the connection being established, information identifying the state of the first extension node to the first extension node and the second extension node.

14. The method of claim 8, further comprising:
determining a termination of the connection; and
releasing the bidirectional isochronous channel based on the termination of the connection.

15. A method comprising:
determining, by a first device, a first device identifier for a second device and a second device identifier, that is different from the first device identifier, for a third device, the first device, the second device, and the third device being connected via a bidirectional serial bus;
determining, by the first device, a first bus identifier for the second device and a second bus identifier, that is different from the first bus identifier, for the third device;
establishing, by the first device and using the bidirectional serial bus, a communication session between the second device and the third device;
determining, by the first device and during the communication session, an occurrence of a bus reset of the bidirectional serial bus;
determining, by the first device and during the communication session, a change of at least one of the first device identifier or the second device identifier resulting from the occurrence of the bus reset; and
notifying, by the first device and during the communication session, the second device and the third device of the change of the at least one of the first device identifier or the second device identifier to minimize an intermission of communication caused by the occurrence of the bus reset.

16. The method of claim 15, where establishing the communication session includes:
securing, based on a request to establish the communication session, a first isochronous channel and a second isochronous channel; and
establishing the communication session over the first isochronous channel and the second isochronous channel.

17. The method of claim 15, where establishing the communication session includes:
receiving a request to establish the communication session from the second device,
transmitting, based on the request, a signal to the third device via an asynchronous channel, and
establishing the communication session via a pair of isochronous channels based on receiving, from the third device, a response to the signal.

18. The method of claim 15, where the occurrence of the bus reset results from a fourth device being connected to the bidirectional serial bus during the communication session.

19. The method of claim 18, where notifying the second device and the third device of the change of the at least one of the first device identifier or the second device identifier includes:
transmitting, to the second device and the third device, information identifying a third device identifier and a third bus identifier, the third device identifier and the third bus identifier being associated with the fourth device.

20. The method of claim 15, further comprising:
determining a termination of the communication session; and
releasing the first isochronous channel and the second isochronous channel based on the termination of the communication session.

* * * * *